(12) United States Patent
Prabandham et al.

(10) Patent No.: US 7,810,105 B2
(45) Date of Patent: Oct. 5, 2010

(54) METHOD AND APPARATUS FOR RUNNING DIFFERENT TYPES OF APPLICATIONS ON A WIRELESS MOBILE DEVICE

(75) Inventors: Harish Prabandham, Cupertino, CA (US); John D. Bruner, South Barrington, IL (US); Rahul Sharma, San Jose, CA (US); Jianliang Zhao, Sunnyvale, CA (US)

(73) Assignee: Motorola, Inc., Schaumburg, IL (US)

( * ) Notice: Subject to any disclaimer, the term of this patent is extended or adjusted under 35 U.S.C. 154(b) by 932 days.

(21) Appl. No.: 11/025,518

(22) Filed: Dec. 29, 2004

(65) Prior Publication Data

US 2006/0143622 A1 Jun. 29, 2006

(51) Int. Cl.
G06F 3/00 (2006.01)
G06F 9/44 (2006.01)
G06F 9/46 (2006.01)
G06F 13/00 (2006.01)

(52) U.S. Cl. .................................................. 719/328
(58) Field of Classification Search .................. 719/328
See application file for complete search history.

(56) References Cited

U.S. PATENT DOCUMENTS

| | | | |
|---|---|---|---|
| 5,652,879 A * | 7/1997 | Harris et al. ........................ 1/1 |
| 6,363,409 B1 * | 3/2002 | Hart et al. ...................... 718/1 |
| 6,854,123 B1 * | 2/2005 | Lewallen .................... 719/328 |
| 7,107,584 B2 * | 9/2006 | Bond et al. .................. 717/151 |
| 7,210,121 B2 * | 4/2007 | Xia et al. ..................... 717/106 |
| 7,275,251 B2 * | 9/2007 | Gitelson et al. ............. 719/328 |
| 7,370,335 B1 * | 5/2008 | White et al. ................. 719/328 |
| 7,580,703 B1 * | 8/2009 | Veselov et al. ........... 455/414.1 |
| 7,581,231 B2 * | 8/2009 | Smith et al. ................. 719/328 |
| 7,636,922 B2 * | 12/2009 | Odins-Lucas et al. ....... 719/328 |
| 2001/0016881 A1 * | 8/2001 | Sanchez et al. ............. 709/328 |
| 2002/0049603 A1 | 4/2002 | Mehra et al. |
| 2002/0188869 A1 * | 12/2002 | Patrick ....................... 713/201 |
| 2003/0050932 A1 * | 3/2003 | Pace et al. .................. 707/100 |
| 2003/0165130 A1 * | 9/2003 | Wodzianek et al. ......... 370/338 |
| 2004/0216125 A1 * | 10/2004 | Gazda et al. ................ 719/310 |
| 2005/0282532 A1 * | 12/2005 | Dotan et al. ................ 455/418 |
| 2006/0037030 A1 * | 2/2006 | Kovachka-Dimitrova et al. 719/328 |

OTHER PUBLICATIONS

The Open Services Gateway Initiative; OSGi Service Platform, Release 3; Mar. 2003; published by IOS Press; pp. 1-588.

* cited by examiner

*Primary Examiner*—Hyung S Sough
*Assistant Examiner*—KimbleAnn Verdi
(74) *Attorney, Agent, or Firm*—Vedder Price P.C.

(57) ABSTRACT

A method and wireless mobile device runs different types of applications and groups a set of common application interfaces (APIs) that are associated with an application type to produce an application container (902). The wireless mobile device and method translates calls between at least one of the linked or grouped common APIs of the application container and a shared API that is shared for example among applications of different types (904). If desired the method and device also groups a set of common application interfaces associated with another application type to produce another application container. The applications of different types use APIs from the multiple application containers. In one embodiment, the translating of calls is accomplished by employing a class loading structure using, for example, a class loader that looks at certain path locations to obtain resources.

7 Claims, 7 Drawing Sheets

METHOD AND APPARATUS FOR RUNNING DIFFERENT TYPES OF APPLICATIONS ON A WIRELESS MOBILE DEVICE

FIELD OF THE INVENTION

The present invention relates generally to the field of apparatus and methods for running different types of applications on a single virtual machine, and more particularly to methods and apparatus for running different types of applications in a wireless mobile device.

BACKGROUND OF THE INVENTION

Computing devices and other devices may have different capabilities and features based on the applications installed in their memory. Firmware and applications may be pre-installed to a computing device before purchase by a customer or installed after purchase by a customer or service technician via a storage media, such as a magnetic or optical disk. For computing devices that communicate with a computer network, applications may be installed after a customer or service technician downloads the applications to the computing device.

Wireless mobile devices, such as hand held cell phones, PDA's, non-handheld devices such as lap tops, or any other suitable wireless mobile devices may utilize JAVA applications or may be compliant with various standards and may be for example J2ME compliant devices. Such devices have security managers which enforce security policies which are a type of rule or rules to ensure that various security constraints are maintained within the device. One security policy may be that only certain applications supplied by certain authors or sources can invoke SMS messaging. Numerous other security policies are also known and enforced by the security policy manager. In addition, certain mobile device platforms may use defined JAVA specification requests (JSR) which is a set of API's defined for a particular mobile device operational platform. One JAVA specification for mobile devices is a J2ME compliant device that employs mobile information device profiles (MIDP). MIDlets are JAVA applications that run in a MIDP environment. An execution environment is a set of API's and rules governing its usage and security model that are defined for that particular type of an application. Therefore a MIDP environment is an environment that uses a defined set of JSR's and other API's.

There are multiple types of applications used on wireless mobile devices today. Some examples include MIDlet applications, Doja applications, Xlet applications, native applications, and others. Each different application may, for example, use a different set of APIs and libraries that are expected differ by the different types of applications. The different types of applications may be written in the same languages, or different languages. For example, Linux native applications, JAVA based MIDlet applications, binary run time environment applications and other different types of applications for example assume a certain set of features exist in a platform in a wireless mobile device. One type of application may expect a certain engine and associated libraries, whereas another application type may expect a different set of libraries and APIs and further, each application type may use a different security model. Wireless mobile devices need to support different application types and each application type may require an execution environment, security policies and API/libraries in the format that they expect. For example, where a wireless mobile device utilizes two or more JAVA execution environments, there may be different security models employed by the different execution environments.

Wireless operators for example want different types of applications to be supported within the same device and may also require the provisioning of additional application types after the device ships, such as by over the air provisioning. In addition, wireless operators may like to have upgrades of APIs also be made over the air if possible and also allow the control of security policies for the different application types. From the users perspective, the user of the wireless mobile device likely does not want to distinguish between different types of applications running on a given device.

However, from a wireless mobile device manufacturer's perspective, supporting multiple application types can be very expensive since there is development and testing costs associated with the different application types, additional flash/RAM sizes of the device which can vary and increase the costs, and there may be a different application life cycle interaction, security aspects and application management aspects that need to be addressed for each application type.

One way of handling multiple application types would be to duplicate sets of APIs, libraries and engines that are required by each application type, but with processor constrained and memory constrained devices such as wireless mobile devices RAM and Flash/Disk can be expensive and is typically a precious resource. Therefore duplicating such sets of libraries typically come at additional cost.

Devices are known for example that employ Linux Wine, which uses a set of libraries at run time that adapt Windows operating system APIs to APIs of a Linux operating system to allow one execution environment to communicate with another. These emulators typically emulate the instruction set at the hardware level and therefore are not portable when the underlying hardware changes and moreover these come at additional cost in terms of RAM and Flash.

Therefore a need exists for a method and apparatus that facilitates the running of different types of applications in a wireless mobile device.

DETAILED DESCRIPTION OF THE PREFERRED EMBODIMENTS

Figure 1:
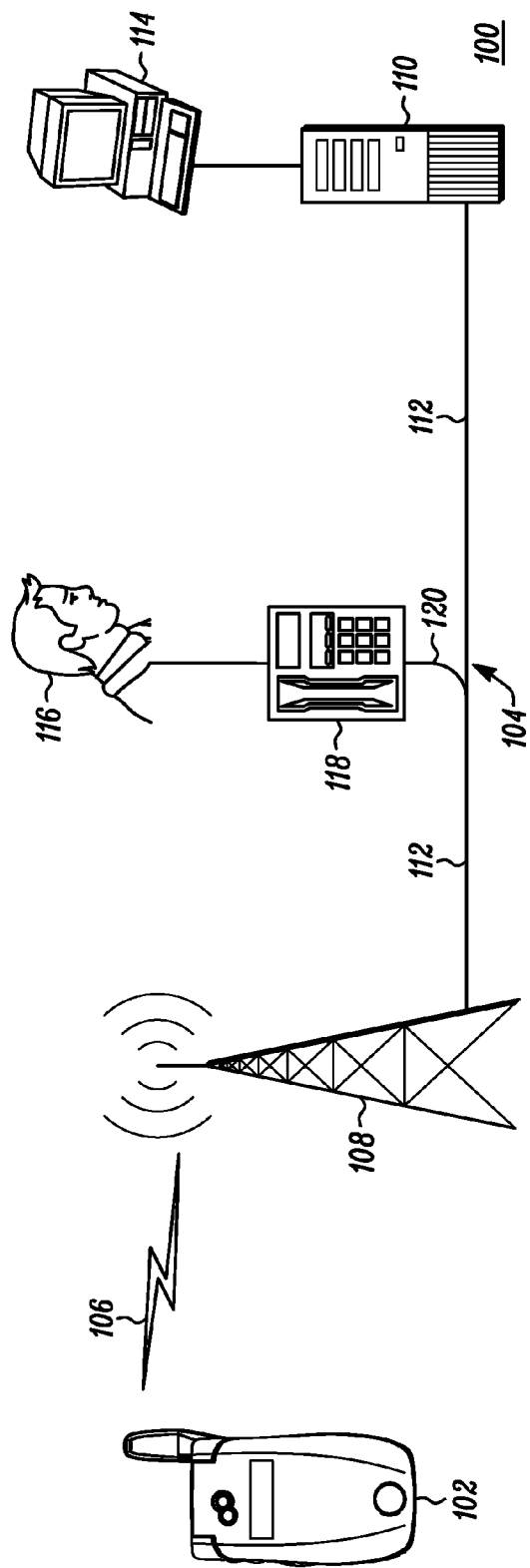
FIG. 1 is a schematic view illustrating an embodiment of a wireless communication system in accordance with the present invention.

Briefly, a method and wireless mobile device runs different types of applications and groups a set of common application interfaces (APIs) that are associated with an application type to produce an application container. The wireless mobile device and method translates calls between at least one of the linked or grouped common APIs of the application container and a shared API that is shared for example among applications of different types. If desired the method and device also groups a set of common application interfaces associated with another application type to produce another application container. The applications of different types use APIs from the multiple application containers. In one embodiment, the translating of calls is accomplished by employing a class loading structure using, for example, a class loader that looks at certain path locations to obtain resources. As such a hierarchy of class loaders is used to translate for example JAVA API function calls to different JAVA API calls.

In one embodiment, the shared APIs are APIs that are used, to access hardware operations of the device. In one example the shared APIs are written in a native language and may for example run on top of an operating system directly and not through a JAVA virtual machine. As another example, the shared APIs are written as JAVA APIs that are common across all the application types and run directly on the JAVA virtual machine.

An application container may include for example an API to communicate with an application manager, a group of common application interfaces and an API call translator. The API call translator translates calls between at least one of the linked or grouped common APIs of the application container and a shared API, such as a native API that is shared among applications of different types. An application container is run time code that runs one type of application, security model and all necessary code for APIs and each application container uses shared APIs and libraries that are shared among multiple types of different application types.

The API call translator is translation code that translates API call functions, for example, from APIs provided by a container to the calling application and translates calls into calls for the shared APIs and may call multiple shared APIs in a shared API layer. The wireless mobile device and method uses a single JAVA virtual machine, for example, to reduce the flash/RAM size so that a single JAVA virtual machine may be used even though there are different application types. In one embodiment, an OSGi framework and a class loader are used to implement the API call translator. In one example, application containers use class loaders for enforcing and mapping application specific security models to, for example, the JAVA 2 Security model. API Isolation is accomplished for example, by using a configuration file that allows or denies access to specific classes and packages. In one example, application container uses a configuration file to selectively isolate the classes. This configuration file may also be modified as necessary to allow additional APIs to be loaded. The application containers map the life cycle of the application and the life cycle expected by an application manager. An application life cycle is a state of the application as it goes through various stages of execution, for example, start, stop, suspend, resume etc. These life cycle states are implemented in one embodiment as a set of life cycle API method calls for a particular application type. The application container provides a generic API that used by the application manager to control the life cycle of the applications executing within it. The APIs provided by the application container translate the generic APIs into the life cycle method calls for the application type.

Referring to FIG. 1, there is provided a schematic view illustrating an embodiment of a wireless communication system 100. The wireless communication system 100 includes a wireless communication device 102 communicating with a wireless communication network 104 through a wireless link 106. Any type of wireless link 106 may be utilized for the present invention, but it is to be understood that a high speed wireless data connection is preferred. For example, the wireless communication network 104 may communicate with a plurality of wireless communication devices, including the wireless communication device 102, via a cellular-based communication infrastructure that utilizes a cellular-based communication protocols such as AMPS, CDMA, TDMA, GSM, iDEN, GPRS, EDGE, UMTS, WCDMA and their variants. The wireless communication network 104 may also communicate with the plurality of wireless communication devices via a peer-to-peer or ad hoc system utilizing appropriate communication protocols such as Bluetooth, IEEE 802.11, IEEE 802.16, and the like.

The wireless communication network 104 may include a variety of components for proper operation and communication with the wireless communication device 102. For example, for the cellular-based communication infrastructure shown in FIG. 1, the wireless communication network 104 includes at least one base station 108 and a server 110. Although a variety of components may be coupled between one or more base stations 108 and the server 110, the base station and server shown in FIG. 1 is connected by a single wired line 112 to simplify this example.

The server 110 is capable of providing services requested by the wireless communication device 102. For example, a user of the device 102 may send a request for assistance, in the form of a data signal (such as text messaging), to the wireless communication network 106, which directs the data signal to the server 110. In response, the server 110 may interrogate the device and/or network state and identify one or more solutions. For those solutions that require change or correction of a programmable module of the device 102, the server 110 may send update data to the device via the wireless link 106 so that the programmable module may be updated to fulfill the request. If multiple solutions are available, then the server 110 may send these options to the device 102 and await a response from the device before proceeding.

The wireless communication system 100 may also include an operator terminal 114, managed by a service person 116, which controls the server 110 and communicates with the device 102 through the server. When the server 110 receives the request for assistance, the service person may interrogate the device and/or network state to identify solution(s) and/or select the best solution if multiple solutions are available. The service person 116 may also correspond with the device 102 via data signals (such as text messaging) to explain any issues, solutions and/or other issues that may be of interest the user of the device.

The wireless communication system 100 may further include a voice communication device 118 connected to the rest of the wireless communication network 104 via a wired or wireless connection, such as wired line 120, and is available for use by the service person 116. The voice communication device 118 may also connect to the network via the server 110 or the operator terminal 114. Thus, in reference to the above examples, a user of the device 102 may send a request for assistance, in the form of a voice signal, to the wireless communication network 106, which directs the data signal to the server 110. While the server 110 and or the service person 116 is interrogating the device and/or network state, identifying one or more solutions, and/or selecting an appropriate solution, the service person may correspond with the device 102 via voice signals to explain any issues, solutions and/or other issues that may be of interest the user of the device.

Figure 2:
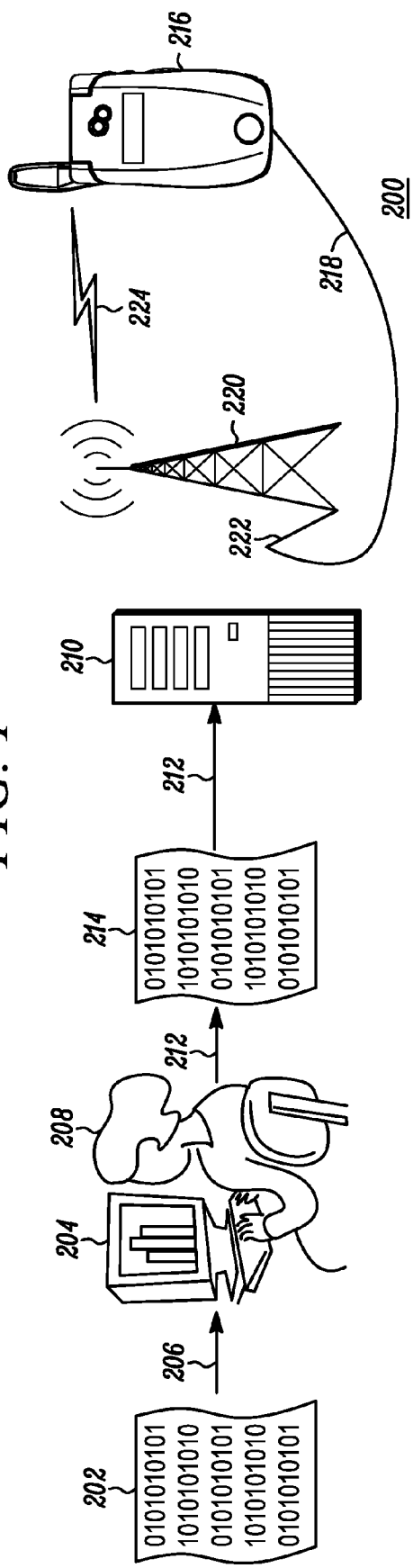
FIG. 2 is a schematic view illustrating another embodiment of the wireless communication system in accordance with the present invention.

Referring to FIG. 2, there is provided a schematic view 200 illustrating another embodiment of the wireless communication system. For this embodiment, operator requirements 202 are received by a service terminal 204 via a first connection 206 and a service person 208 operates the service terminal 204, if necessary. For example, the service person 208 may provide information about a desired operator and/or needs of a device user so that the appropriate operator requirements 202 are received. The service terminal 204 may optionally be connected to a server 210 by a second connection 212. Regardless of whether the server 210 is used, the service terminal 204 generates appropriate components 214 that should be sent to a wireless communication device 216 operated by the user in accordance with the operator requirements 202 and associated information. The device 216 may be coupled to the service terminal 204 or the server 210 via a wired connection 218, 222 such as a cable or cradle connection to the device's external connector, or a wireless connection. The wireless connection may include a wireless communication network that includes a base station 220 connected to the service terminal 204 or the server 210 and a wireless link 224 communication with the device 216.

Figure 3:
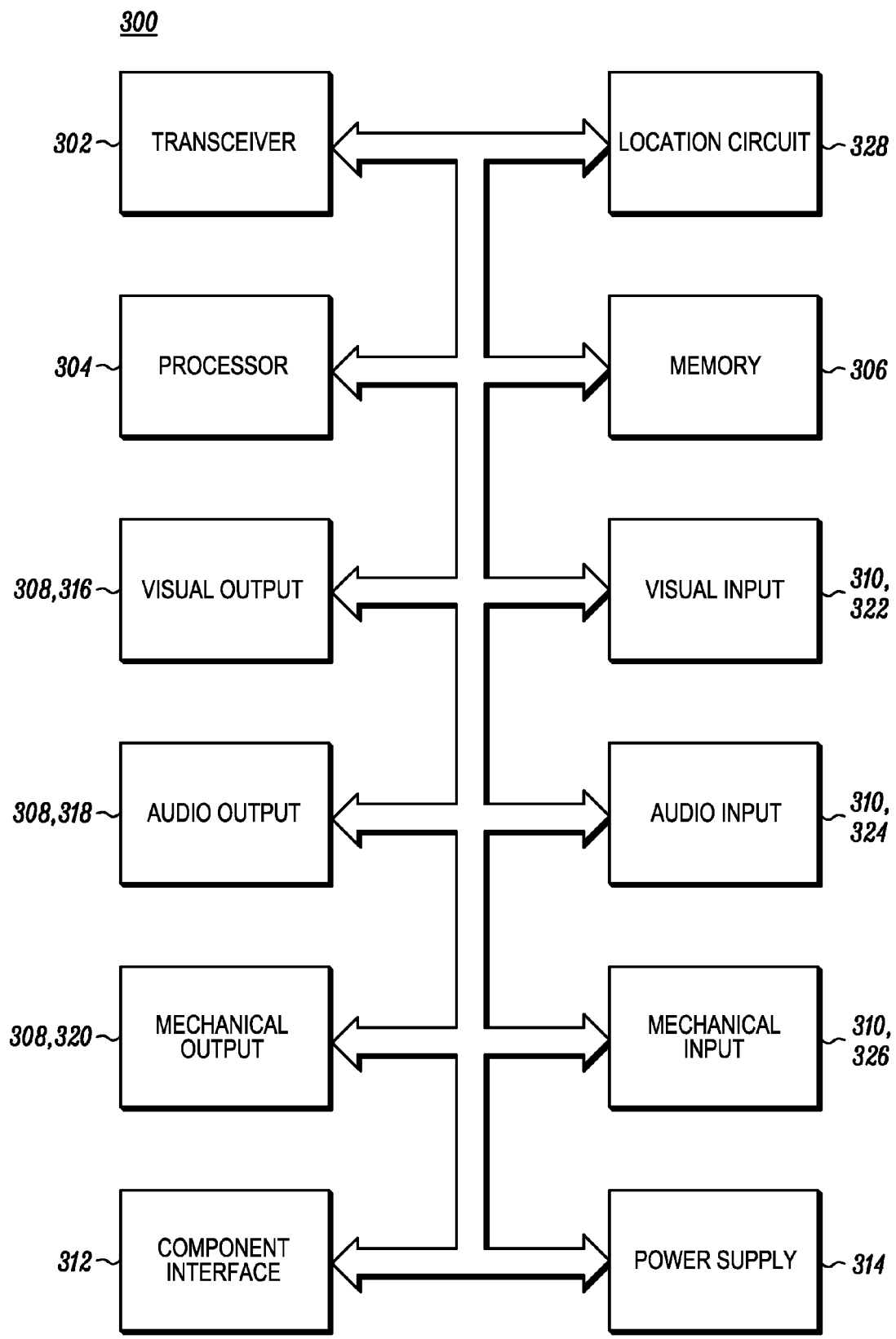
FIG. 3 is a block diagram illustrating exemplary internal components of various servers, controllers and devices that may utilize the present invention.

Referring to FIG. 3, there is provided a block diagram illustrating exemplary internal components of various servers, controllers and devices that may utilize the present invention, such as the wireless communication devices 102, 316 and the servers 110, 310 of FIGS. 1 and 2. The exemplary embodiment includes one or more transceivers 302, a processor 304, a memory portion 306, one or more output devices 308, and one or more input devices 310. Each embodiment may include a user interface that comprises at least one input device 310 and may include one or more output devices 308. Each transceiver 302 may be a wired transceiver, such as an Ethernet connection, or a wireless connection such as an RF transceiver. The internal components 300 may further include a component interface 312 to provide a direct connection to auxiliary components or accessories for additional or enhanced functionality. The internal components 300 preferably include a power supply 314, such as a battery, for providing power to the other internal components while enabling the server, controller and/or device to be portable.

Referring to the wireless communication devices 102, 316 and the servers 110, 310 of FIGS. 1 and 2, each machine may have a different set of internal components. Each server 110, 310 may include a transceiver 302, a processor 304, a memory 306 and a power supply 314 but may optionally include the other internal components 300 shown in FIG. 2. The memory 306 of the servers 110, 310 should include high capacity storage in order to handle large volumes of media content. Each wireless communication device 102, 316 must include a transceiver 302, a processor 304, a memory 306, one or more output devices 308, one or more input devices 310 and a power supply 314. Due to the mobile nature of the wireless communication devices 102, 316, the transceiver 302 should be wireless and the power supply should be portable, such as a battery. The component interface 312 is an optional component of the wireless communication devices 102, 316.

The input and output devices 308, 310 of the internal components 300 may include a variety of visual, audio and/or mechanical outputs. For example, the output device(s) 308 may include a visual output device 316 such as a liquid crystal display and light emitting diode indicator, an audio output device 318 such as a speaker, alarm and/or buzzer, and/or a mechanical output device 320 such as a vibrating mechanism. Likewise, by example, the input devices 310 may include a visual input device 322 such as an optical sensor (for example, a camera), an audio input device 324 such as a microphone, and a mechanical input device 326 such as a flip sensor, keyboard, keypad, selection button, touch pad, touch screen, capacitive sensor, motion sensor, and switch.

The internal components 300 may include a location circuit 328. Examples of the location circuit 328 include, but are not limited to, a Global Positioning System (GPS) receiver, a triangulation receiver, an accelerometer, a gyroscope, or any other information collecting device that may identify a current location of the device.

The memory portion 306 of the internal components 300 may be used by the processor 304 to store and retrieve data. The data that may be stored by the memory portion 306 include, but is not limited to, operating systems, applications, and data. Each operating system includes executable code that controls basic functions of the communication device, such as interaction among the components of the internal components 300, communication with external devices via the transceiver 302 and/or the component interface 312, and storage and retrieval of applications and data to and from the memory portion 306. Each application includes executable code utilizes an operating system to provide more specific functionality for the communication device, such as file system service and handling of protected and unprotected data stored in the memory portion 306. Data is non-executable code or information that may be referenced and/or manipulated by an operating system or application for performing functions of the communication device.

The processor 304 may perform various operations to store, manipulate and retrieve information in the memory portion 306. Each component of the internal components 300 is not limited to a single component but represents functions that may be performed by a single component or multiple cooperative components, such as a central processing unit operating in conjunction with a digital signal processor and one or more input/output processors. Likewise, two or more components of the internal components 300 may be combined or integrated so long as the functions of these components may be performed by the communication device.

Figure 4:
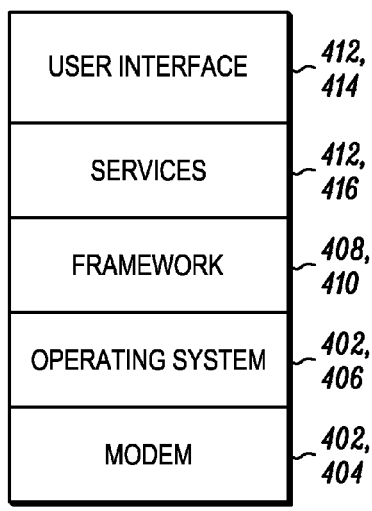
FIG. 4 is a block diagram representing the functional layers of a client device in accordance with the present invention.

In accordance with the present invention, an expansion of known frameworks for more suitability to a wireless device operability is disclosed herein. FIG. 4, illustrates a basis architecture of a mobile device in accordance with the present invention. Existing known mobile devices are typically architected such that applications are loaded on top of a fixed base platform. APIs for applications are fixed at manufacture. Therefore it is not possible to postpone, for example, new media types and/or other upgrades without re-flashing the entire device. Turning to FIG. 4, a mobile device of the present invention utilizes an open OS, such as for example, Linux or Windows. Additionally, a modem interface is abstracted such that it is agnostic to the particular interface, for example radio interfaces such as GSM, CDMA, UMTS, etc. that would traditionally utilize dedicated functionality.

Referring to FIG. 4, there is provided a block diagram generally representing functional layers 400 included in the memory portion 306 (shown in FIG. 3) of a client device, such as the wireless communication device 102, 216. The functional layers 400 include low-level layers 402 including a modem layer 404 and an operating system layer 406, a mid-level layer 408 also known as a framework layer 410, and high-level layers 412 including a user interface layer 414 and a services layer 416. The modem layer 404 may be an abstracted interface to a modem circuit of the client device in which services are accessed through message passing. The modem layer 404 may be air-interface agnostic, i.e., may operate using a wide variety of air interface protocols. The modem layer 404 may also be an abstracted interface to an RTOS, and executive application programming interfaces (API's) may be encapsulated in a thin interface layer. Further, the modem code may be on a separate processor or co-resident with application code.

The operating system layer 406 operates above the modem layer 404 and provides basic platform services for the client device, such as process management, memory management, persistent storage (file system), Internet networking (TCP/IP), and native access security and application-to-application protection. The operating system layer 406 may expose native services based upon standards-defined API's (POSIX). The operating system layer 406 may host native applications, such as system daemons, specific-language interpreters (such as JAVA), and second-party native applications (such as a browser). Daemons are executable code that run as separate background processes and provide services to other executable code(s) or monitor conditions in the client device.

The framework layer 410 provides an operable interface between the low-level layers 402 and the high level layers 412 that provides ample opportunities for current and future functions and, yet, is efficient enough to avoid provide unnecessary code that may waste precious memory space and/or slow-down the processing power of the client device. Key features of the framework layer 410 may include, but are not limited to, hierarchical class loaders, application security, access to native services, and compilation and translation technology for performance. Although the operating system layer 406 may host system daemons and specific-language interpreters, the framework layer 410 should actually include such system daemons and specific-language interpreters. The framework layer 410 may also include a framework for managing a variety of services and applications for the client device. For one embodiment, the framework layer 410 is an always-on CDC/FP/PBP JVM running OSGi framework.

The services layer 416 is adapts the framework layer 410 to wireless communication services. The services layer 416 includes services packaged in modular units called bundles that are separately life-cycle managed (e.g., start, stop); are separately provisioned, upgraded and withdrawn; and abstracts the complexity of the service implementation from a user of the client device. Services are modular, extensible and postponeable so that, within the services layer 416, services may be added, upgraded and removed dynamically. In particular, the services layer 416 includes a lookup mechanism so that services may discover each other and applications may discover services used by other services, e.g., service provider interfaces (SPI's), and services used by applications, e.g., application programming interfaces (API's).

An API is a formalized set of function and/or method calls provided by a service for use by a client device, whereas an SPI is a set of interfaces and/or methods implemented by a delegated object (also called provider) providing an API to the client device. If an API is offering methods to client devices, more API's may be added. Extending the functionality to offer more functionality to client devices will not hurt them. The client device will not use API's that are not needed. On the other hand, the same is not true for SPI's. For SPI's, the addition of a new method into an interface that others must provide effectively breaks all existing implementations.

The user interface layer 414 provides application management functionality for managing applications and the user interface for the client device. The user interface layer 414 includes lightweight APIs for coordinating user interaction among the underlying services of the services layer 416. Also, the user interface layer 414 is also capable of managing native applications and language-specific application, such as JAVA. The user interface layer 414 creates a unifying environment for the native applications and the language-specific applications so that both types of applications have a similar "look and feel". The native applications utilize components of a native toolkit, and the language-specific applications utilized components of a corresponding language-specific toolkit. For the user interface layer 414, a language-specific user interface toolkit is built on the native toolkit, and MIDlets are mapped to the language-specific user interface toolkit.

Figure 5:
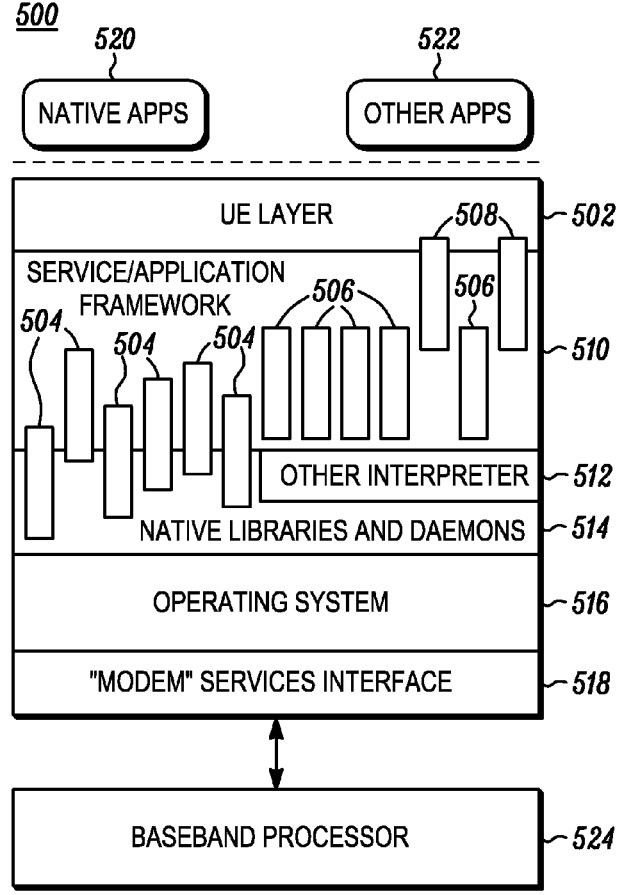
FIG. 5 is a block diagram illustrating an embodiment of the functional layers of the client device in accordance with the present invention.

FIG. 5 illustrates details of a mobile device architecture, having dual processors, in accordance with some embodiments of the present invention. In FIG. 5 a Service/Application Framework provides services such as but not limited to; messaging, security, DRM, device management, persistence, synchronization, and power management. An abstracted modem service interface communicates with the baseband processor, wherein the baseband processor may communicate over any suitable radio interface. In FIG. 5, the UE Layer, may be implemented for example in Java. The Operating System is an open operating system and may utilize for example Linux or Windows.

Unlike prior art architectures, as previously mentioned, wherein applications are loaded on top of a fixed base platform, applications as shown in the embodiments illustrated by FIG. 5 are architected in a more flexible structure. In accordance with the embodiments of FIG. 5, application and feature upgrades, new content types, new standards-based upgrades, new operator specific service libraries, and component upgrade and repair are facilitated.

Referring to FIG. 5, there is provided a block diagram illustrating a first client embodiment 500 included in the memory portion 306 of the client device, such as the wireless communication device 102, 216. The first client embodiment 500 includes a UE layer 502, a plurality of services 504, 506, 508, a service/application framework 510, an other or language-specific interpreter 512 (such as JAVA Virtual Machine), native libraries and daemons 514, an operating system 516, and a modem services interface 518. The UE layer 502 interacts with native applications 520 and language-specific applications 522, such as JAVA. The modem services interface interacts 518 with a baseband processor 524 of the client device.

The applications are user-initiated executable code whose lifecycle (start, stop, suspend, pause, resume) may be managed. The applications may present a User Interface and/or may use services. Each daemon is an operating system (OS) initiated, executable code that runs as a separate background process. Daemons may provide services to other executable code or monitor conditions in the client.

There is organizational cooperation of the services 504, 506, 508 with the mid-level layer 408 which includes the service/application framework 510, the language-specific interpreter 512 and the native libraries and daemons 514 as well as the UE layer 502. As represented by FIG. 5, the types of available services include native-based services 504 which rely on one or more components of the native libraries and daemons 514, language-specific services 506 which rely on components associated with the language-specific interpreter 512, and native or language-specific services 508 that further rely on components of the UE layer 502.

A service is a set of functionality exposed via a well-defined API and shared among applications. A service has as least two characteristics, namely a service interface and a service object. The service interface is the specification of the service's public methods. The service object implements the service interface and provides the functionality described in the interface. A service may provide methods that present a User Interface. Invoking a method on a service is done in the caller's context (thread/stack). Services may return a value to the requesting client by depositing it on the caller's stack, unlike an invoked application. The implementation of the service may be replaced without affecting its interface. Examples of services include, but are not limited to, messaging, security, digital rights management (DRM), device management, persistence, synchronization and power management.

A system service is a low-level service specific to an operating system or MA (CDMA, TDMA, GSM, 3G etc.) and is not part of the abstract set of services exposed to the applications directly. System service APIs should not be used by any component that is intended to portable across all instantiations of the platform. A framework service is a service that exposes a higher level abstraction over system services and provides OS-independent and MA-independent access to infrastructure components and services. An application service is a service that exposes application-specific functionality (both UI and non-UI) via a well defined API. A native service is a service written in native code.

A library is a set of services contained in an object that can either be statically linked or dynamically loaded into executable code. Library services may invoke other library services or services contained in daemons, which are external to the library and may also run in a different process context.

Figure 6:
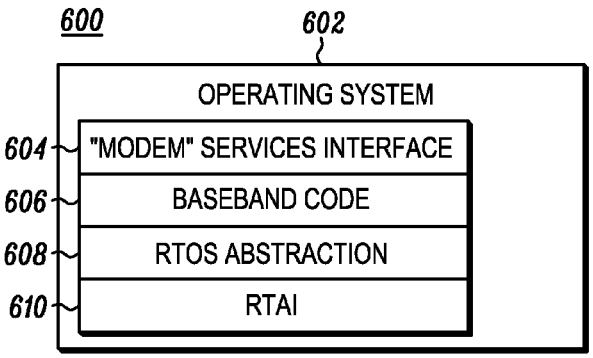
FIG. 6 is a block diagram illustrating another embodiment of the lower level functional layers of the client device in accordance with the present invention.

Referring to FIG. 6, there is provided a block diagram illustrating a second client embodiment 600 of the lower level functional layers of the client device. The first client embodiment 500 represents a dual processor architecture of a client device, whereas the second client embodiment 600 represents a single core architecture of a client device. For the second client embodiment 600, the operating system 602 includes the modem services interface 604 and a baseband code 606. In addition, the operating system 602 may include other components, such as an RTOS abstraction 608 and an RTAI 610.

Figure 7:
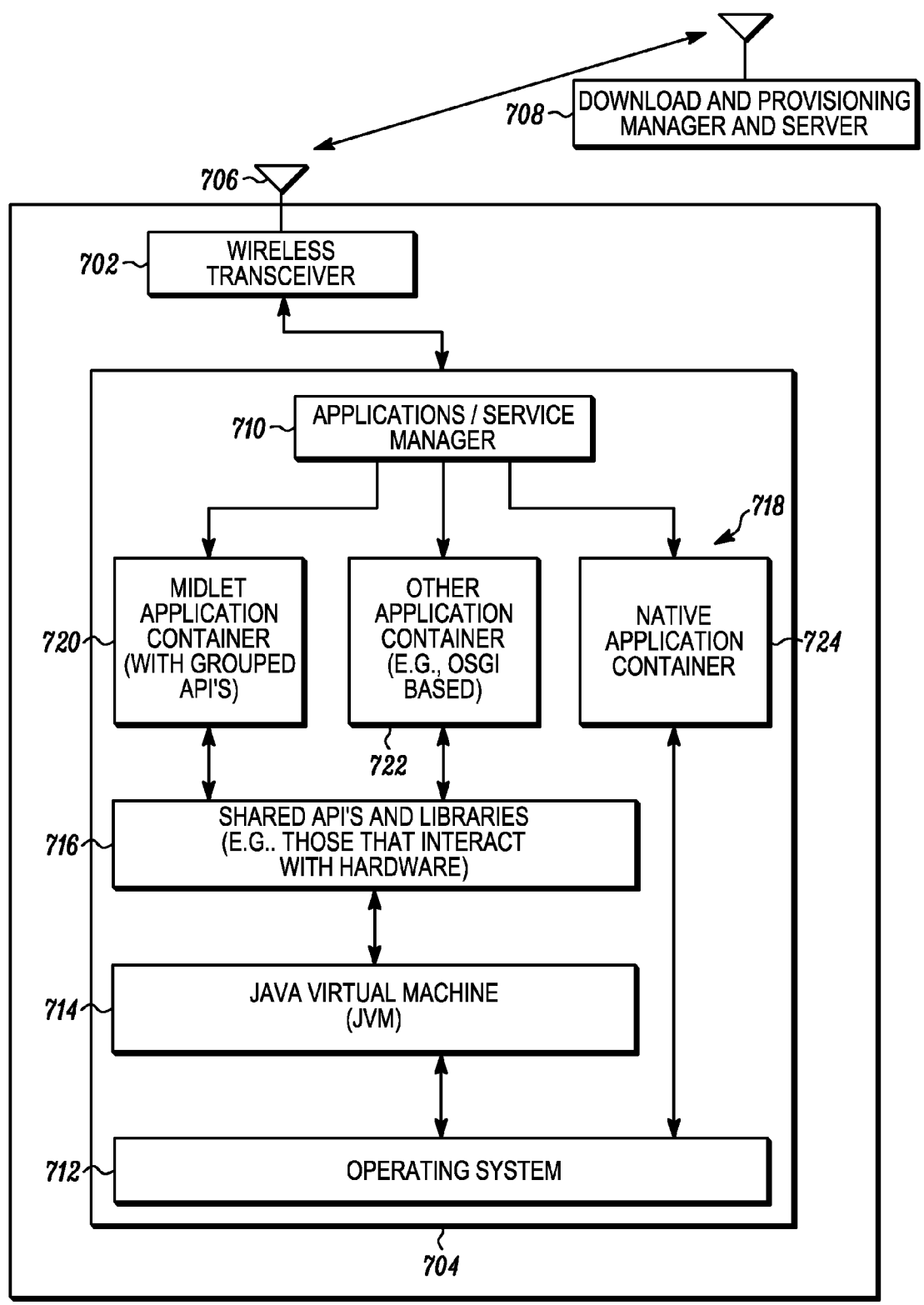
FIG. 7. is a functional block diagram illustrating one example of a wireless mobile device for running different types of applications in accordance with one embodiment to the invention.

FIG. 7 illustrates one example of a wireless mobile device 700 for running different types of applications and in this example, includes a wireless transceiver 702 and a suitably programmed processor 704 which a described above may be implemented as one or more processing devices, discrete logic, or any suitable combination of hardware, software, or firmware. The wireless transceiver 702 is coupled to an antenna 706 for communication to a download and provisioning manager and server 708 or to any suitable network. The download and provisioning manager and server 708 for example, provides over the air provisioning of application containers and code as desired and may also provide any other suitable information or communication with the wireless mobile device 700. The wireless mobile device 700 also includes suitable memory that stores executable code that when executed by the processor 704 carries out the operations as described herein.

The processor 704 is shown as executing a plurality of code modules which in this example include an application/service manager 710, an operating system 712, a JAVA virtual machine 714 (JVM) (such as a JAVA 2 virtual machine that may employ for example a JAVA 2 security model), shared APIs 716 defined herein to include libraries if desired, and a plurality of application containers 718.

In this example, the plurality of application containers 718 include a MIDlet application container 720, other application containers such as an OSGi based application container 722 (e.g. JAVA 2 application container), and a native application container 724. As shown, in this example the native application container 724 communicates with the operating system 712 but does not interface with the JAVA virtual machine 714. However, it will be recognized that any suitable configuration may be employed. Each of the functional blocks, as shown, communicate with one another through conventional communication links shown by the arrows, such as through suitable API method calls or any other suitable techniques.

Figure 8:
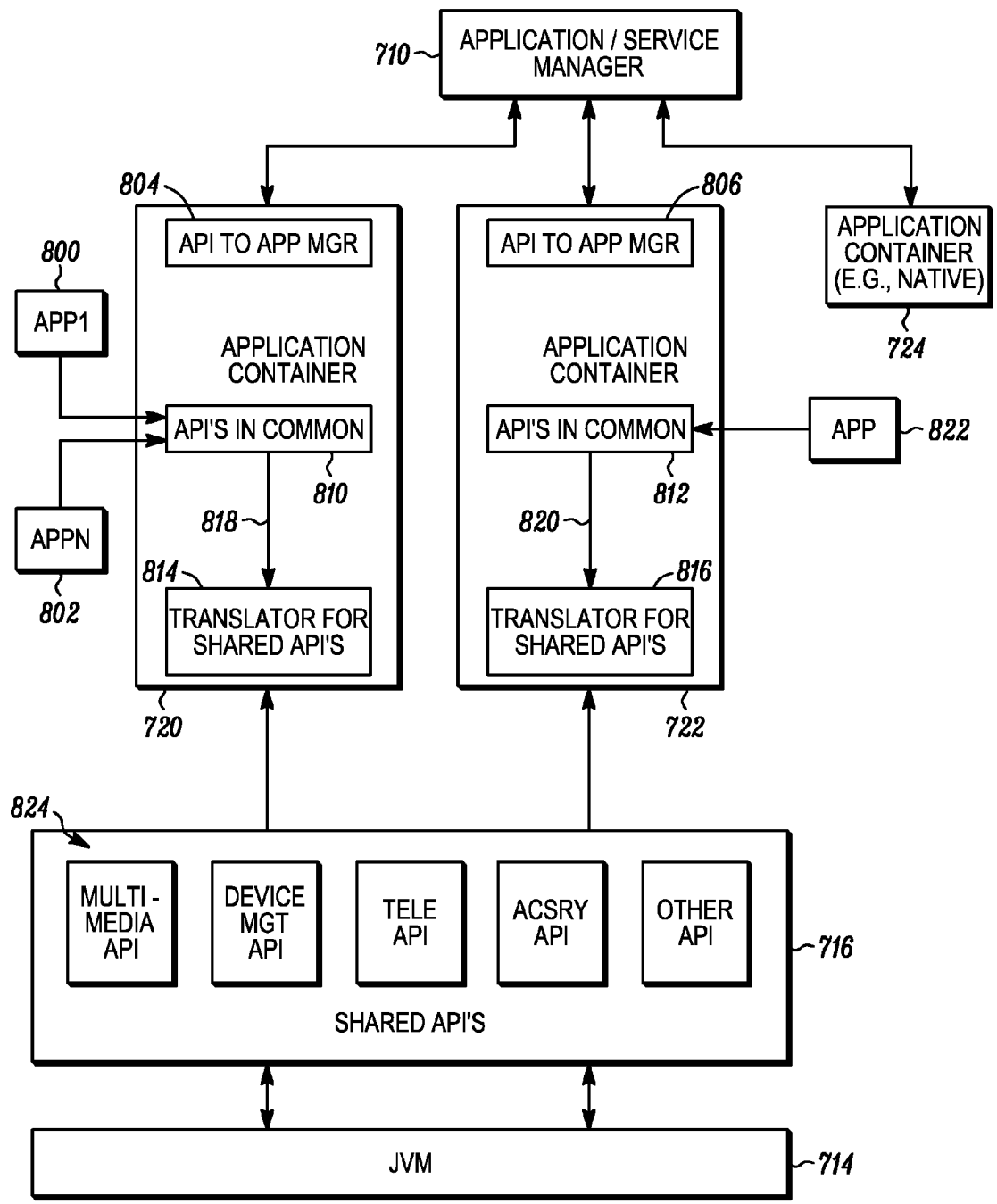
FIG. 8 is a functional block diagram illustrating one example of a wireless mobile device for running different types of applications in accordance with one embodiment to the invention.

FIG. 8 illustrates one example of some of the operations of the processor 704 shown in FIG. 7 in more detail. In this example, application container 720 serves an application container for multiple applications designated 800 and 802. Each application container 720 and 722 for example implement an API 804 and 806 to allow interfacing between each application container 720 and 722 and the application service manager 710. Application 800 and 802 are the same application type. For example these may be to be MIDlets. However, it will be recognized that any suitable application type and application container may be employed.

As also shown, the application containers 720 and 722 include a group of common application interfaces 810 and 812 respectively associated with application types. In one embodiment the isolation of common APIs are accomplished by using a configuration file. As such, the processor 704 creates a configuration file that identifies the API's (and any other suitable information) in a given group. In addition, each application container 720 and 722 includes an API call translator 814 and 816 that receives for example calls 818 and 820 from respective APIs common in each container to interface with shared APIs 716. The API call translator 814 in each application container translates calls between one of the linked common API's 810 and a shared API 716 that is shared among applications but use API's from a first and second application container. In this example, application 822 is of a different application type from applications 800 and 802, however, applications 800 and 822 for example both use the shared APIs 716. The application container 720 also includes code that provides a runtime environment for the applications 800 and 802. The application container executes the application on behalf of the application service manager.

In this example, the shared API's 716 are shared APIs that are used to interface with hardware components or processes of the wireless mobile device. As shown in this example, the shared APIs 716 may include for example a multimedia API, a device management API, a telephone API, an accessory API, or any other suitable shared APIs generally shown as 824.

The API call translator 814 also links libraries and security policies common to a given application type to further define each application container. In one embodiment each API call translator is written to translate one or more API calls provided by the shared APIs.

The JAVA virtual machine 714 employs a JAVA 2 security model in this example and as shown application 822 may be a JAVA 2 application such as in OSGi bundle. The application container itself may be packaged as a OSGi bundle and can be provisioned into the device via over the air provisioning mechanisms. MIDlet applications 800 also use the JAVA virtual machine 714 since the API call translators 814 and 816 translate API calls into appropriate formats for the shared APIs 824 that are used by the JAVA virtual machine 714.

The application service manager 710 manages applications running within the application containers by using the generic API 804 and 806 provided by the application containers 720 and 722 respectively. This application service manager is utilized by the User Interface layer 412 and 414 to provide a unified application and service management for all the applications within the device. The application service manager also determines which application container to use for providing the runtime execution environment when a new bundle containing an application is provisioned to the device.

An application container 718 is a managed run time environment for deploying and executing applications. The application containers 720 and 722 for example determine what APIs are exposed to the respective applications 800, 802 and 822, the life cycle of the applications, and the security mechanisms and policies exposed to the applications and utilize respective API call translators 814 and 816 to translate function calls or other calls to the shared APIs 716. The API call translators 814 and 816 are part of a framework and include a set of JAVA classes and class loaders that provide APIs to one or more application containers. As used herein, managed run time environment is code for deploying and executing applications.

Figure 9:
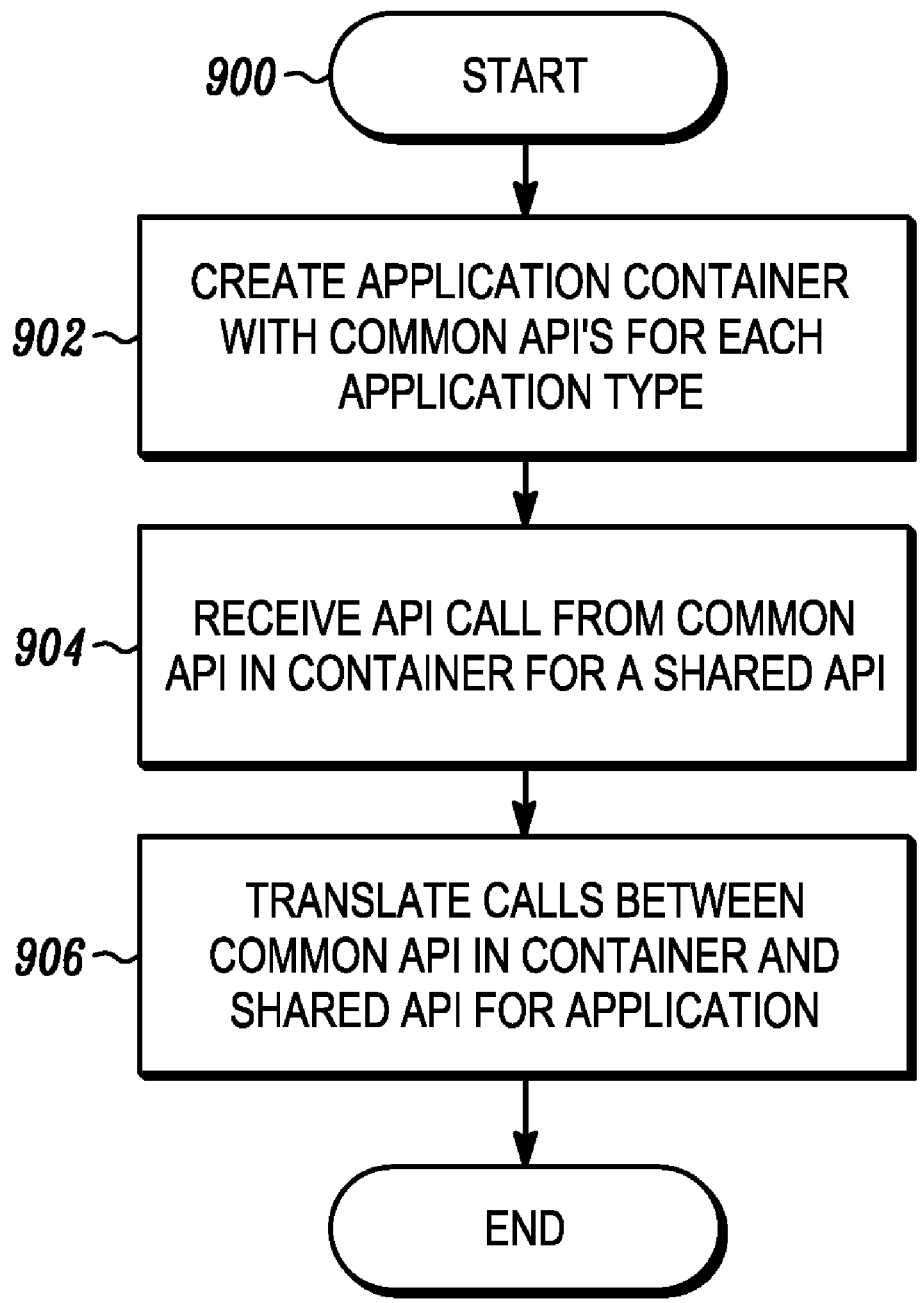
FIG. 9 is a flow chart illustrating one example of a method for running different types of applications in a wireless mobile device in accordance with one embodiment to the invention.

FIG. 9 illustrates one example of the operation of for example creating an application container 720 and 722 and subsequently translating calls by applications associated with each respective application container although the applications are of different types. As shown in block 900, the method begins by having the wireless mobile device 700 receive an over the air application container 718. Alternatively, different types of application containers can be preloaded on the device. The method includes determining which different application types are present. As shown in block 902, the method includes creating an application container 718 that each contain common APIs for one or more applications. As such, step 902 occurs to create an application container if they are not already present. As such is shown in block 904 receiving the API call 818 for example from a common API and a container for a shared API may be done for example by the API call translator 814. As shown in block 906, the method includes translating a call 818 for example with a format for calling a shared API 716 and, in the other direction, translating calls by the shared API 716 to common APIs 810.

Figure 10:
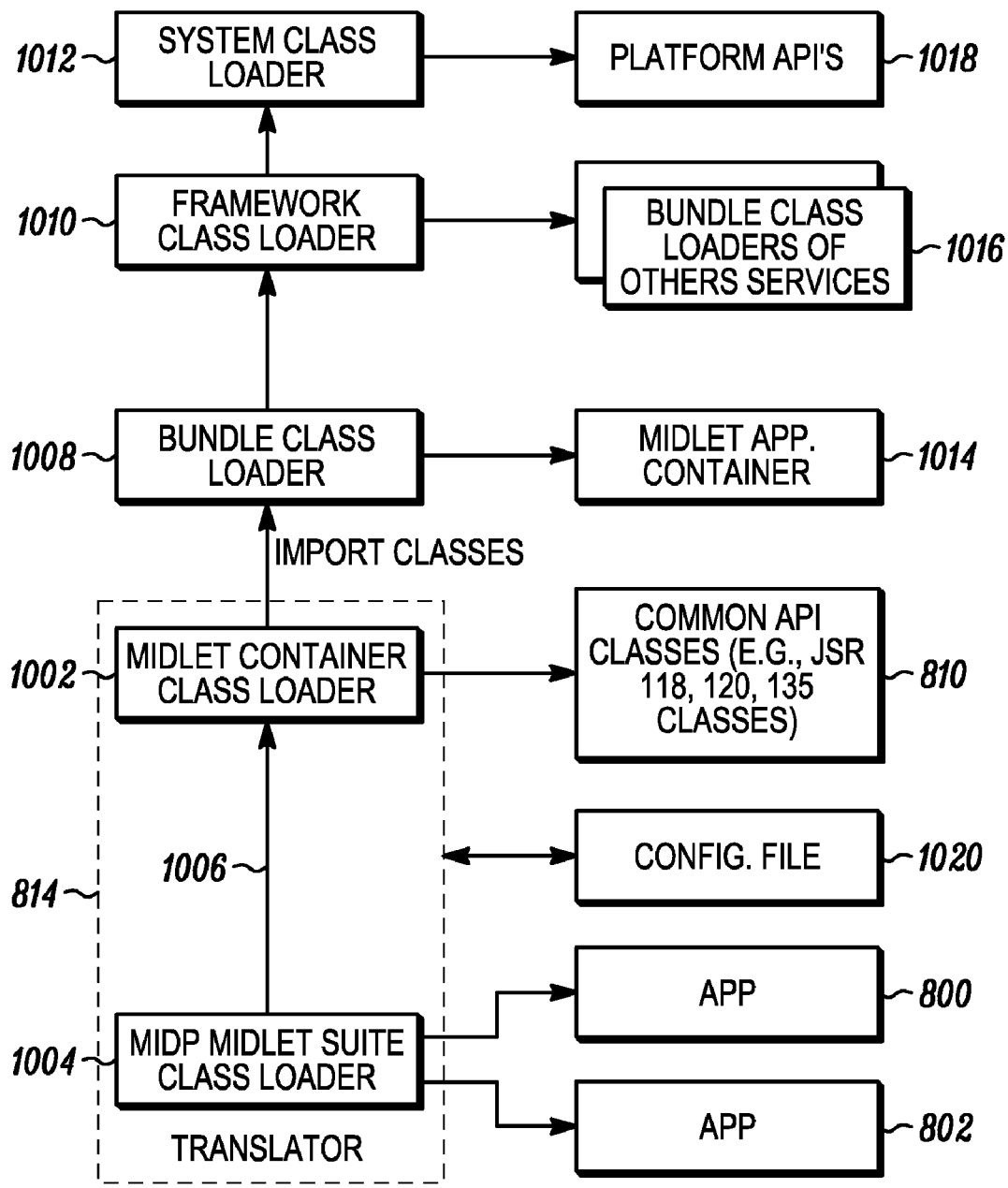
FIG. 10. is a functional block diagram illustrating one example of a portion of a wireless mobile device for running different types of applications in accordance with one embodiment to the invention.

FIG. 10 illustrates one example of the mechanism used by an API call translator 814 where the applications 800 are MIDP applications for example. As such application container 720 is considered to be a MIDlet container in a JAVA environment. The API call translator 814, may include for example a MIDlet container class loader 1002 and a MIDP MIDlet suite class loader 1004. The MIDP MIDlet suite class loader 1004 loads the classes of the applications 800 or 802 which ever application is using the common APIs 810. The MIDP MIDlet suite class loader 1004 isolates the application specific classes in 800 and 802 and may be created on demand to provide the runtime execution environment for the applications. The MIDlet container class loader 1002 uses a configuration file to isolate and selectively expose the shared APIs.

The MIDlet container class loader 1002 then loads, for example one or more commons APIs in 810 such as a JSR 120, JSR 135 or other APIs and common APIs 810. In one embodiment, the JVM 714 provides a system class loader 1012 and the OSGi provides a bundle class loader 1008 and a framework class loader 1010 and the implementation of 720 includes the MIDlet container class loader 1002 and MIDP MIDlet suite class loader 1004. A bundle class loader 1016 for other services may also be employed if desired.

In one embodiment, the class loaders 1012, 1010, 1008, 1002 and 1004 are organized hierarchically. The system class loader 1012 and Framework class loader 1010 are responsible for loading shared APIs 824 and platform APIs 1018. The bundle class loader 1008 is responsible for loading the MIDlet application container 720. MIDlet container class loader is responsible for loading the common API classes 810 and the MIDlet suite class loader is responsible for loading the application specific classes 800 and 802.

For example, the MIDlet container class loader 1002 maintains a configuration of classes that are imported and maintains a table that maps MIDP security models to JAVA 2 permissions in a configuration file 1020. As such, security mapping is also provided. The system class loader for example loads the shared APIs required by all the application containers.

Application container upgrades may also be accomplished by dynamic class import updates since a table may be modified that controls the imported classes dynamically. As such, an API 804 may be included to modify the entries of the table that controls access to classes and the API 804 may be used to modify the security policies settings for the application container.

As such, the application containers may provide isolation by selectively filtering out the classes exposed by the system class loader 1012, framework class loader 1010 and bundle class loader 1008, security and scope/visibility even though applications that are running on a mobile wireless device for example may have different application containers that may have different concurrency, life cycle, and interaction models. Multiple application containers can coexist at the same time and can be dynamically isolated by using class loaders. Once the applications are executing within the application containers, they are basically indistinguishable to an end user. A single application management interface can be used to manage applications deployed on any container and new containers may be dynamically added if desired by over the air provisioning. Containers that are not used may also be unprovisioned or stopped to save Flash/RAM on the wireless device.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for running different types of applications in a wireless mobile device, the method comprising:

grouping, by the wireless mobile device, a set of common application interfaces (APIs) associated with an application type of one or more of the applications to produce an application container;

grouping, by the wireless mobile device, a set of common application interfaces (APIs) associated with another application type of one or more of the applications to produce another application container;
translating, by the wireless mobile device, calls between the grouped common APIs of the application containers and a shared application interface (API), wherein the shared API is shared among the applications of different types; and
grouping, by the wireless mobile device, security policies common to a given application type of one or more of the applications to further define each of the application containers.

2. The method of claim 1 including executing, in the wireless mobile device, a virtual machine to run the different types of the applications that are accessing the shared API through a the grouped common APIs in the application containers.

3. The method of claim 2 wherein the shared API interfaces with hardware elements in the wireless mobile device and wherein translating calls between at least one of the grouped common APIs of the application containers and the shared API that is shared between the application containers includes employing a hierarchical class loader operation to translate the calls between the at least one of the grouped common APIs of the application containers and the shared API that is shared among the applications of different types.

4. A wireless mobile device for running different types of applications, the wireless mobile device comprising:
a wireless transceiver;
a processor operatively coupled to the wireless transceiver; and
memory operatively coupled to the processor, the memory comprising executable instructions that when executed cause the processor to run different types of applications by:
grouping a set of common application interfaces (APIs) associated with an application type of one or more of the applications to produce an application container;
grouping a set of common application interfaces (APIs) associated with another application type of one or more of the applications to produce another application container;
translating calls between at least one of the grouped common APIs of the application containers and a shared application interface (API), wherein the shared API is shared among the applications of different types; and
grouping security polices common to a given application type of one or more of the applications to further define the application containers.

5. The wireless mobile device of claim 4 wherein the memory further comprises executable instructions that when executed cause the processor to execute a virtual machine to run the different types of the applications that are accessing the shared API, through the grouped common APIs in the application containers.

6. The wireless mobile device of claim 4 wherein the shared API interfaces with hardware elements in the wireless mobile device and wherein the processor is programmed to translate calls between at least one of the grouped common APIs of the application containers and the shared API that is shared between the application containers by employing a hierarchical class loader operation to translate the calls between the at least one of the grouped common APIs of the application containers and the shared API that is shared among the applications of different types.

7. A method for running different types of applications in a wireless mobile device, the method comprising:
grouping, by the wireless mobile device, a set of common application interfaces (APIs) associated with an application type of one or more of the applications to produce an application container;
translating, by the wireless mobile device, calls between the grouped common APIs of the application container and a shared application interface (API), wherein the shared API is shared among the applications of different types; and
grouping, by the wireless mobile device, security polices common to a given application type of one or more of the applications to further define the application container,
wherein the application container includes:
an API to communicate with an application manager;
a runtime environment for one or more of the applications; and
an API call translator operative to translate calls between the grouped
common APIs of the application container and the shared API.

* * * * *